United States Patent [19]
Yagi et al.

[11] 3,945,582
[45] Mar. 23, 1976

[54] CASSETTE TAPE

[75] Inventors: Motoi Yagi, Zushi; Morio Akino, Fujisawa; Hisaharu Takeuchi, Kawasaki, all of Japan

[73] Assignee: Tokyo Shibaura Electric Co., Ltd., Kawasaki, Japan

[22] Filed: Apr. 24, 1974

[21] Appl. No.: 463,614

[30] Foreign Application Priority Data
Apr. 30, 1973  Japan.................................. 48-48153

[52] U.S. Cl.......................................... 242/55.19 A
[51] Int. Cl.²......................................... B65H 17/48
[58] Field of Search.............. 242/55.19 A, 55.19 R; 360/95, 93

[56] References Cited
UNITED STATES PATENTS

| | | |
|---|---|---|
| 2,911,215 | 11/1959 | Cousino....................... 242/55.19 A |
| 3,257,084 | 6/1966 | Cole, Jr. ....................... 242/55.19 A |
| 3,285,526 | 11/1966 | Moore ......................... 242/55.19 A |
| 3,681,539 | 8/1972 | Eibensteiner............ 242/55.19 A X |

*Primary Examiner*—Edward J. McCarthy
*Attorney, Agent, or Firm*—Oblon, Fisher, Spivak, McClelland & Maier

[57] ABSTRACT

A tape cassette comprises a case open at its top and having a tape-loaded reel rotationally mounted therein, a cover slidably opening and closing the opening of the case in a sidewise direction, and a pair of tape delivery members mounted on the forward portion of the cover to permit the part of the tape to be delivered merely upon withdrawal of the covering.

7 Claims, 7 Drawing Figures

CASSETTE TAPE

This invention relates to a tape cassette of the type in which part of a tape can be delivered out upon loading the tape onto a tape travelling device.

A video tape recorder (VTR) is generally used as a device for recording and reproducing video signals such as TV signals. The conventional video tape recorder adapted to record and reproduce video signals through a magnetic head of a rotary type requires a servo mechanism for tracking and furthermore, a rotary head mechanism and a tape travelling mechanism are complicated in construction. This provides a bar to the simplification and miniaturization of the video tape recorder, resulting in an extremely high cost.

To obviate the above-mentioned drawbacks, there has been considered a device for recording and reproducing video signals using an endless tape and a stationary magnetic head. In this device the tape is required to travel stably at a high speed, such as, a speed of more than 3m per second. A tape travelling mechanism used in this case is different from a low-speed tape travelling mechanism for an acoustic signal recording and reproducing device and is constructed, for example, as will be set forth below. An endless tape wound around a reel is delivered from the innermost periphery of a tape roll, passed between a capstan and an inlet pinch roll and between the capstan and an outlet pinch roll, and wound around the outermost periphery of the tape roll. The tape passed between the capstan and the inlet pinch roll is scanned by a stationary magnetic head, while being guided along a head facing guide disposed opposite the magnetic head.

Where the tape is embodied in a cassette form, it is impossible in the above-mentioned tape travelling device to provide the pinch roll on the cassette, in view of stable tape travelling, unlike a tape travelling device for acoustic signals. For this reason it is required that, upon loading the cassette tape onto a tape travelling device, part of the tape be delivered outward for insertion into a tape passage between the magnetic head and head guide of the tape travelling device.

In this case the tape is directly manually delivered outward from the case, so that its operation is very cumbersome and, furthermore, it is very difficult to quickly load the tape onto the tape travelling device in a good loading condition.

Accordingly, an object of this invention is to provide a tape cassette capable of readily delivering the part of a tape outward without the necessity of directly manually contacting the tape and when loading of the tape onto a tape travelling device by a simple operation.

Another object of this invention is to provide a tape cassette capable of being readily removed from the tape travelling device.

This invention can be more fully understood from the following detailed description when taken in conjunction with the accompanying drawings, in which.

Figure 1:
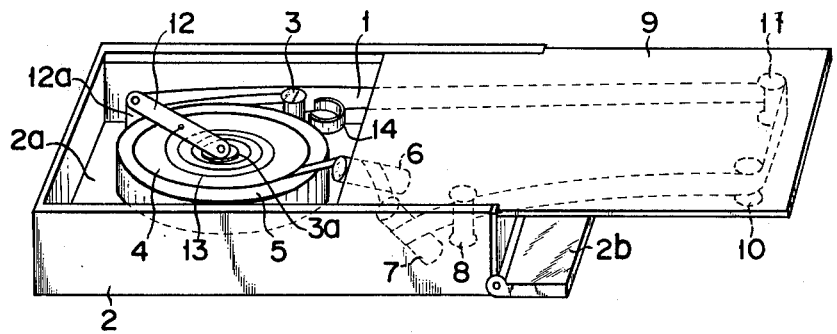
FIG. 1 is a perspective view of a tape cassette according to one embodiment of this invention.

Referring now to the drawings, a tape casette according to one embodiment of this invention, is shown having an endless tape 1, preferably being a magnetic tape, but not restricted thereto, is wound around a reel 4 rotatably supported on a shaft 3a and housed within a rectangular case 2. The shaft 3a is securely mounted on the rear part of a base plate 2a. The front wall 2b of the case 2 is pivoted on the base plate and may be swung about the pivot to open the front side of the case 2. Movement of the tape 1 is effected by a mechanism to be later described so that the tape is delivered from the innermost periphery of a tape roll 5 and then is wound around the outermost periphery thereof. Below the tape roll 5 means (not shown) for preventing the tape from being largely expanded outward under a centrifugal force applied to the tape roll 5 due to the high travelling speed of the tape is provided in a manner to contact with the lower surface of the tape roll.

Near the tape roll 5 are provided first and second fixed guide poles 6 and 7 extending slantwise relative to the base plate 2a. The tape delivered from the innermost periphery of the tape roll 5 is oriented, through the guide poles 6 and 7, with its lower edge run parallel with the base plate. Ahead of the second guide 7 is provided a third fixed guide pole 8 projecting vertically relative to the base plate and having flanges at its upper and lower ends. The guide pole 8 may prevent any movement of the tape across the width of the tape running between the flanges.

In the upper portions of the opposite side walls of the case 2, guide grooves are provided so that a covering 9 can be slidably moved relative to the case 2 to open and close the upper opening of the case 2. At the forward portion of the under surface of the covering 9 a pair of tape delivery poles 10 and 11 are vertically projected with a predetermined space left therebetween. The tape delivery pole have at their free ends a flange adapted to be contacted with the lower edge of the tape to thereby prevent the tape from dropping downwardly.

Figure 1A:
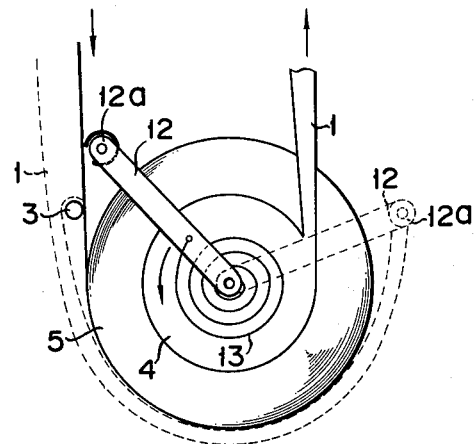
FIG. 1a is a plan view showing part of the tape cassette of FIG. 1.

With the tape cassette according to this invention there is provided a mechanism for eliminating a loosened portion of the tape. The mechanism has a swinging arm 12, the base end of which is pivotally mounted on the upper end of the shaft 3a and the free end of which is extended outwardly of the tape roll 5. The swinging arm 12 has a downwardly directing guide roll 12a rotatably mounted at its free end. Midway of the arm 12 there is anchored one end of a spiral spring 13, the other end of the spiral 13 being secured to the shaft 3a. As a result, the swinging arm 12 is normally urged in a counter-clockwise direction and located in a position in a dash line shown by FIG. 1a while being held, during tape travelling, by a position shown in a solid line in FIG. 1a against the force of the spiral spring 13 so that the roll 12a exerts no influence on the travelling tape. The holding in the latter position of the swinging arm is attained, for example, by providing a leaf spring 14 bent in a U-shape for holding therein the roll 12a ahead of the tape roll 5. A fourth pole 3 is provided near the leaf spring 14. As a result, the tape passed through the pole 11 is turned at the roll 12a mounted on the forward end of the swinging arm 12, again turned at the fourth pole 3 and then wound around the outermost periphery of the tape roll 5, while the tape is received in the case. Under this condition the tape 1 is kept tensioned by the swinging arm 12 to which a rotation force is applied. The tape continues to be kept tensioned even when the covering 9 is withdrawn from the case 2, as shown in FIG. 1, for insertion into a tape travelling device, because the swinging arm 12 is swung in accordance with the extent to which the tape is delivered out through the tape delivery poles 10 and 11. When the tape is caused to move by the tape travelling device, arm 12 is swung to the position shown by solid line in FIG. 1a, where the roll 12a is ahead of the pole 3 and held in its position within spring detent 14, the downwardly extending roll 12a moving outside the roll 3 during its rotational translation in a clockwise direction against the biasing force of spring 13. Consequently, the tape passed about the pole 11 is then wound on the outermost periphery of the tape roll 5 without being influenced by the roll 12a.

Figure 2:
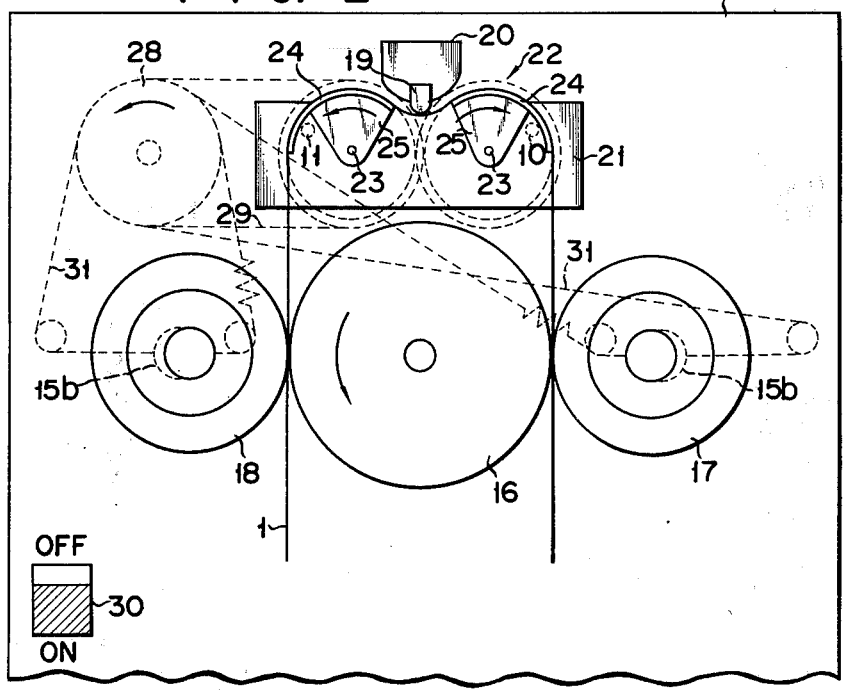
FIG. 2 is a plan view showing one aspect of a tape travelling device capable of being used in combination with the cassette tape of this invention.
Figure 3:
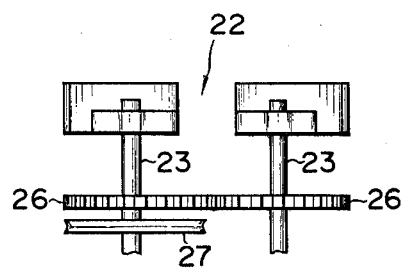
FIG. 3 is a side view showing a pair of guide members used in the tape travelling device of FIG. 2.
Figure 4:
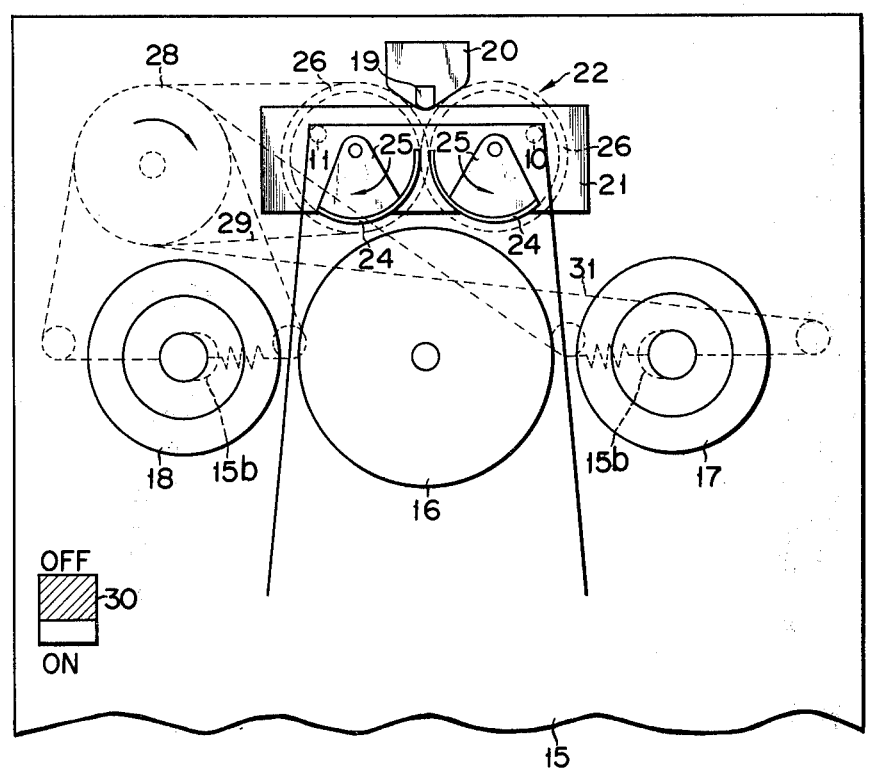
FIG. 4 is a plan view showing another aspect of the tape travelling device of FIG. 2.

The above-mentioned tape cassette is loaded onto a tape travelling device, for example, as shown in FIGS. 2 to 4, when signals are recorded to, and reproduced from, the tape.

A cassette tape travelling device, shown in FIGS. 2 to 4, is suitable for running the above-mentioned cassette tape when loaded therein. On a substrate 15 there are provided a capstan 16, adapted to be rotated in the direction of an arrow shown in FIG. 2 by a motor (not shown), and inlet and outlet pinch rolls 17 and 18 respectively situated at opposite sides of the capstan 16. These pinch rolls 17 and 18 have their surface layers made of rubber. During a tape travelling, the pinch rolls, in association with the capstan, permit the tape to be brought into a scanning position. When the tape is loaded, the pinch rolls 17, 18 are located away from the capstan 16 so that the tape can be easily inserted between the capstan and the pinch roll. With this embodiment, elongated holes 15b are provided in the substrate 15 and the respective shafts of the pinch rolls are inserted into the respective elongated holes so that the pinch rolls can be moved along the elongated holes.

At the front portion of the substrate 15 a stationary magnetic head 19 is located opposite to, and at a predetermined interval from, the capstan 16. The magnetic head 19 is mounted on a head base 20. The magnetic head 19 and head base 20 are integrally movable vertically, i.e. across the width of the tape, relative to the substrate 15, by a suitable drive mechanism, not shown. On the substrate between the magnetic head and the capstan there is provided a tape supporting plate 21 for supporting the lower side edge of the tape. A guide device 22 is rotationally mounted on the supporting plate 21. In the first rotational position of the guide device, a wide tape passage is provided between the magnetic head and the guide device 22 so that the delivered tape portion can be readily inserted into the cassette tape travelling device, and in the second rotational position of the guide device 22, a narrower tape passage is provided so that the magnetic head 19 can normally scan the magnetic tape. The guide device 22 has a pair of rotatable support shafts 23 extending upward through the substrate 15. A pair of rotational bodies 25 are mounted to the respective projecting ends of the support shafts 23. The rotational bodies 25 have respective arcuate guide plates 24 mounted on their peripheries. The rotational body is substantially sectional in configuration and has the support shaft 23 near its central axis. The guide plates 24, when in the second or scanning position, are moved closest to the head base 20 as shown in FIG. 2 to permit the magnetic head 19 to scan the magnetic tape slidably travelling along the guide plate 24. When the support shafts 23, and thus the rotational bodies 24, are rotated through about 180° into the first or tape inserting position, the rotational bodies 25, and thus the guide plates 24, are moved furthest away from the head base 20 so that the wide tape passage is defined, as shown in FIG. 4, between the guide plate 24 and the magnetic head 19. This permits the magnetic tape to be easily inserted between the magnetic head 19 and the poles 10, 11. The pair of guide plates 24 may be manually rotated. With this embodiment, however, the pair of guide plates 24 are electrically rotated, as shown below, in synchronism with the movement of the pinch rolls 17, 18. Below the substrate 15 a pair of intermeshing gears 26 are individually coaxially mounted on the support shafts 23. A driven pulley 27 is further mounted to one of the support shafts 23. The driven pulley 27 is operatively connected through a rope 29 to a driving pulley 28 which is driven by a motor. The driving of this motor is controlled by a switch 30 mounted below the base substrate 15. The driving pulley 28 is operatively connected by a rope and spring assembly 31 to the pair of pinch rolls 17, 18 to permit the pinch rolls 17, 18 to be selectively located into the tape travelling and tape inserting positions in synchronism with the movement of the guide device 22.

There will now be explained the operation of the abovementioned cassette tape travelling device into which the cassette tape of FIG. 1 is incorporated.

When the motor is energized through the switch 30, the guide device 22 and pinch rolls 17, 18 are brought into the tape inserting position in which the wide tape passage is provided. Then, the upper covering 9 is withdrawn from the case 2, as shown in FIG. 1, to cause the tape to be delivered outward through the pair of guide poles 10, 11 as shown in broken lines in FIG. 1. That tape delivery portion defined between the pair of poles 10 and 11 is inserted between the magnetic head 19 and the guide device 22 with the remaining tape delivery portion located between the capstan 16 and the pinch rolls 17, 18. Under this state, the case 2 is fixed by a suitable mechanism, not shown, to the device. Upon energization of the switch 30 the motor is driven to cause the guide plates 24 to the guide device 22 to be rotated through about 180° to permit the tape to be located relative to the magnetic head 19. In synchronism therewith, the pair of pinch rolls 17, 18 are moved along the respective elongated holes 15b into contact with the capstan 16. When the capstan 16 is rotated, the tape 1 is delivered from the innermost periphery of the tape roll 5, then passed through the poles 7, 8 and the nip between the capstan 16 and the inlet pinch roll 17, through the narrow passage between the magnetic head and the guide plate, and then through the nip between the capstan 16 and the outlet pinch roll 18, and wound around the outermost periphery of the tape roll 5.

With the above-mentioned tape cassette, the tape is automatically delivered out by merely withdrawing the covering, a predetermined amount from the case 2. In other words, the tape can be brought into a tape loading position without being touched by the hand of the operator. Consequently, the withdrawal of the covering 9 from the case 2 and thus the delivery of the tape from the case are readily effected without any error. Where the tape cassette is used in combination with the tape travelling device, as shown in FIGS. 2 to 4, the cassette tape can be easily loaded into the tape loading device. Even when the tape is delivered out, the tape is kept tensioned without sagging and there is no fear that the portion of the tape will drop from the case 2 or be entangled on the tape travelling device. Upon removal of the cassette tape from the tape travelling device, that slack or loosened portion of the tape which, during a tape travelling, acts as a buffer can be easily eliminated. After the cassette tape is removed from the tape travelling device, the cassette is closed into an original position by slidably moving the covering 9 relative to the case 2.

Figure 5A:
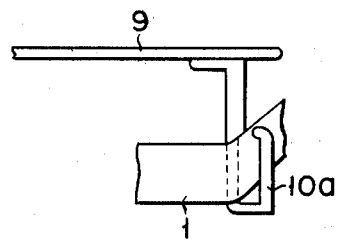
FIGS. 5a and 5b are side and plan views, respectively, showing the variants of the tape delivery member.

Though the pair of flanged poles 10 and 11 are used in the above-mentioned cassette, they should not be taken in a limitative way. For example, use may be made of a pair of tape delivery members 10a, each upwardly bent to have a tape guide space, as shown in FIG. 5a.

Figure 5B:
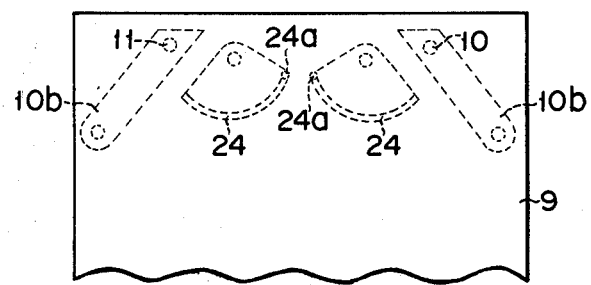

The tape delivery member may be mounted on the free end of a pair of arms 10b, the base ends of which are pivotally mounted at the forward portion of the covering 9, as shown in FIG. 5b, with a predetermined space left between the arms. In this case, a pin 24a is fixed, as shown in dotted lines, at one end of the guide plates 24. When the guide plates 24 of the tape travelling device is swung from the tape loading position to the tape scanning position, the pin 24a pushes the arm 10b to cause it to be swung to permit the tape to be disengaged from the tape delivery member.

What we claim is:

1. A cassette tape comprising:
   a case;
   a reel rotatably mounted on the bottom of said case adjacent one end thereof;
   a cover member slidably mounted on said case for opening and closing the top thereof, said cover member being slidable in one direction away from said one end of said case to expose said reel positioned within said case adjacent said one end thereof and being slidable in an opposite direction for closing said top of said case; and
   tape delivery means mounted on the inside surface of said cover member on the end thereof in the closed position opposite said one end of said case wherein said reel is rotatably mounted for permitting the tape to be carried outside said case upon sliding movement of said cover member in said one direction.

2. A cassette tape according to claim 1, further including tape tension means for tensioning the tape under a predetermined tension force, except during a tape travelling, to prevent a sagging of the tape.

3. A cassette tape according to claim 2, in which said tape tension means comprises:
   an arm pivotable about one end thereof through an axis coincident with the axis of said reel;
   a roll mounted at the opposite free end of said arm for guiding said tape;
   an urging member for swingably urging said arm for causing said tape to be tensioned through said roll; and
   a member for holding the roll in position against the urging force of said urging member during tape travelling, so as to thereby exert no influence on said travelling tape.

4. A cassette tape according to claim 3, in which said urging member is a spring, one end of which is fixed and the other end of which is connected to the arm.

5. A cassette tape according to claim 1, in which said tape delivery means comprises a pair of poles mounted at a predetermined interval near the forward end of said cover member opposite said one end of said case and projecting into the interior of the case and each having its free projecting end a flange for preventing the tape from dropping therefrom.

6. A cassette tape according to claim 1, in which said tape delivery means comprises a pair of tape delivery members mounted at a predetermined interval near the forward end of said cover member opposite said one end of said case and projecting into the interior of the case and each having at its free projecting end an upturned portion defining a tape guide space.

7. A tape cassette according to claim 1, in which said tape delivery means comprises a pair of arms having respective one ends swingably mounted at a predetermined interval on the cover member and a pair of tape guide poles each mounted at the opposite free end of the arm and projecting into the interior of the case.

* * * * *